Oct. 23, 1956    M. M. NOYD    2,767,505
BAIT HOLDING FISHHOOK
Filed Aug. 31, 1954

Milton M. Noyd
INVENTOR.

United States Patent Office 2,767,505
Patented Oct. 23, 1956

2,767,505

BAIT HOLDING FISHHOOK

Milton M. Noyd, Townsend, Mont.

Application August 31, 1954, Serial No. 453,265

4 Claims. (Cl. 43—44.6)

The present invention relates to new and useful improvements in fishhooks and more particularly to means for holding live bait on the hook without injury to the bait.

An important object of the invention is to provide a bait holder mounted on a fishhook and embodying clamping means for attaching to the fins of a minnow or other live bait to secure the bait to the hook.

Another object is to equip the fishhook with U-shaped clamping members between the leg portions of which the bait is positioned to engage the opposite sides of the bait and constructing the clamping members in pairs to provide a stationary jaw and a movable jaw adapted for edgewise coacting gripping engagement with the fins at the opposite sides of a live minnow.

A further object is to provide a bait holder which may be used with either live or cut bait, and which embodies a simple and practical construction, as well as being efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view;

Figures 2 and 3 are enlarged transverse sectional views taken respectively on the lines 2—2 and 3—3 of Figure 1;

Figure 1:
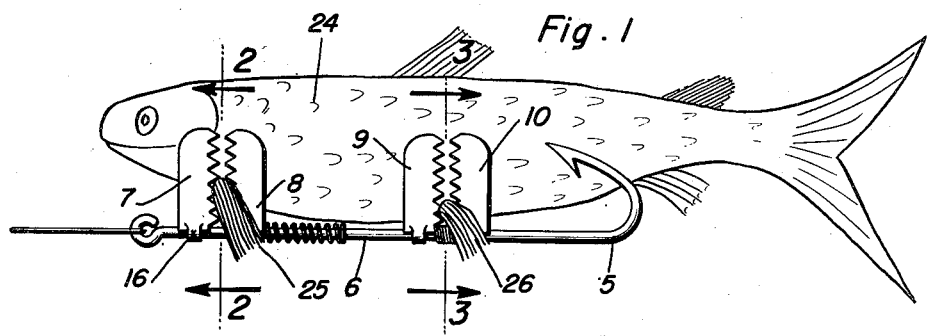

Referring now to the drawings in detail, wherein for the purpose of illustration, I have disclosed a preferred embodiment of my invention, the numeral 5 designates a fishhook on the shank 6 of which a front pair of coacting jaws 7 and 8 and a rear pair of coacting jaws 9 and 10 are mounted.

Figure 2:
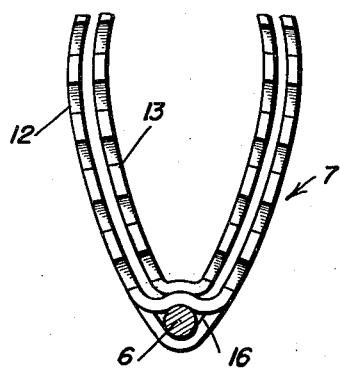
Figure 3:
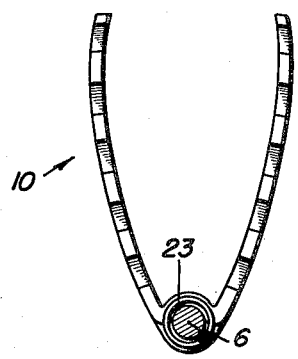
Figure 4:
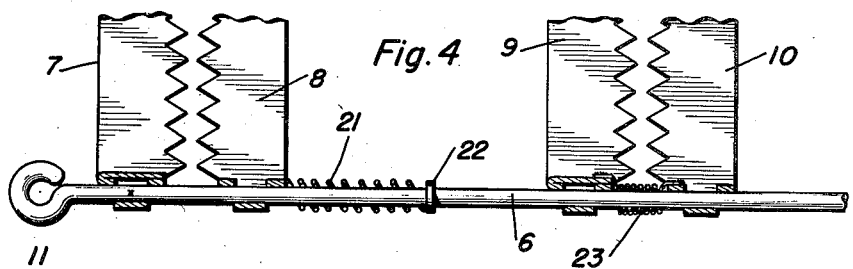
Figure 4 is an enlarged longitudinal sectional view.
Figures 5, 6:
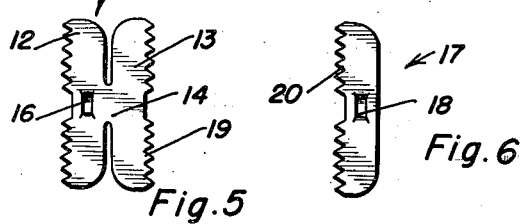
Figure 5 is a plan view of the blank stock prior to shaping the double stationary jaw.
Figure 6 is a plan view of the blank stock for one of the single slidable jaws.

The front jaw 7 is constructed from a metal blank 11 of substantially H-shape to include flat parallel arms 12 and 13 united by a connecting web 14 and the arms are folded upon each other at the web to position the arms in opposing spaced apart relation to each other to form a jaw of double thickness and the arms are then bent to form an H-shaped jaw 7, as shown in Figure 2.

One of the arms 12 of the jaw 7 in the region of the central portion thereof is formed with a loop 16 to receive the shank of the hook and to which the jaw is suitably secured in a fixed position.

Jaw 8 is formed of a blank 17 of single thickness and which is also bent into U-shape and is provided with a loop 18 at its central portion for slidably mounting on the shank of the hook. Jaw 8 is positioned in coacting relation with respect to jaw 7 and the opposing edges of jaws 7 and 8 are formed with teeth 19 and 20 respectively. Teeth 20 of jaw 8 are adapted to enter between the spaced apart arms 12 and 13 of jaw 7.

A coil spring 21 is mounted on the shank of the hook behind jaw 8 and is tensionally held against jaw 8 by a washer 22 fixed to the hook to slide jaw 8 closed against jaw 7.

Jaw 9 of the rear pair of jaws is constructed identical to jaw 7 and jaw 10 is identical to jaw 8 and coact in a similar manner. However, both jaws 9 and 10 are slidable on the shank of the hook and are connected to each other by a contractible coil spring 23 for pulling the jaws toward each other into closed position.

A minnow or other type of bait 24 is placed between the leg portions of the front and rear U-shaped jaws to position the opposing legs of the jaws at opposite sides of the bait and the front fins 25 of the minnow are clamped between the front pair of jaws 7 and 8 while the rear fins 26 are clamped between the rear pair of jaws 9 and 10. The rear jaws are freely slidable on the shank of the fishhook for self-adjusting according to the size of the minnow.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A fish bait holder comprising in combination, a fishhook including a shank, and a pair of U-shaped jaws each adapted to straddle a bait with one jaw forwardly of the other and said jaws being mounted at their bight portions mounted on the shank in edgewise coacting clamping relation with a part of a bait supported in said jaws.

2. A fish bait holder comprising in combination, a fishhook including a shank, and a pair of U-shaped jaws each adapted to straddle a bait with one jaw forwardly of the other and said jaws being mounted at their bight portions mounted on the shank in edgewise coacting clamping relation with a part of a bait supported in said jaws, at least one of said jaws being spring urged into closed position.

3. A fish bait holder comprising in combination, a fishhook including a shank, a pair of U-shaped jaws each adapted to straddle a bait with one jaw forwardly of the other and said jaws being mounted at their bight portions mounted on the shank in edgewise coacting clamping relation with a part of a bait supported between the sides of said jaws, one of said jaws being stationary and the other of said jaws being slidable on the shank and spring means closing said slidable jaw.

4. A fish bait holder comprising in combination a fish hook including a shank, a pair of generally U-shaped jaws mounted on the shank adjacent the eye of the hook, one of the jaws being fixed on the shank, the other being provided with a loop in its bight portion which is threaded on and slidably moveable on the shank and spring urged toward the fixed jaw, the said jaws adapted to partially encircle a live bait and having toothed co-acting edges to clamp the anterior fins between the jaws, one of the said jaws being constituted of two separate U-shaped elements, one mounted within the other, the teeth of the other coacting jaw designed to be urged into the space between the separate U-shaped components of the other jaws.

References Cited in the file of this patent

UNITED STATES PATENTS

| | | |
|---|---|---|
| 600,241 | Walker | Mar. 8, 1898 |
| 883,634 | Fox | Mar. 31, 1908 |
| 1,698,379 | Taylor | Jan. 8, 1929 |
| 1,748,227 | Hyams | Feb. 25, 1930 |
| 2,425,587 | Zuravsky | Aug. 12, 1947 |
| 2,454,879 | Mattingly | Nov. 30, 1948 |
| 2,550,424 | Penn | Apr. 24, 1951 |